United States Patent [19]

Chen

[11] 4,175,213
[45] Nov. 20, 1979

[54] REGENERATOR HAVING AUTOMATIC GAIN CONTROL REFERENCED TO A DATA-PATTERN-DEPENDENT PULSE STREAM

[75] Inventor: William I. Chen, Naperville, Ill.

[73] Assignee: Bell Telephone Laboratories, Incorporated, Murray Hill, N.J.

[21] Appl. No.: 957,831

[22] Filed: Nov. 6, 1978

[51] Int. Cl.² .................... H04L 25/20; H04B 3/04
[52] U.S. Cl. ................................................ 178/70 R
[58] Field of Search .............. 178/70 R, 70 TS, 73, 178/69.1; 179/15 BS; 325/42, 346, 416-420; 333/18, 19, 28; 328/63, 72, 162-164, 179

[56] References Cited

U.S. PATENT DOCUMENTS

| | | | |
|---|---|---|---|
| 3,404,232 | 10/1968 | Burford | 178/70 R |
| 3,728,649 | 4/1973 | Waldhauer | 333/18 |
| 4,015,083 | 3/1977 | Bellisio | 178/69.1 |

Primary Examiner—Thomas A. Robinson
Attorney, Agent, or Firm—Richard B. Havill

[57] ABSTRACT

A roving reference automatic gain control (AGC) arrangement is used in a regenerator of a pulse code modulation (PCM) transmission system. An adjustable gain circuit receives a sequence of data pulses and produces a data-pattern-dependent input signal. A signal channel circuit, responsive to the input signal, produces a data-pattern-dependent detected signal. Regeneration circuitry, responsive to the input signal, produces a regenerated data-pattern-dependent output signal. A reference channel circuit, responsive to the output signal, produces a data-pattern-dependent reference signal. A circuit algebraically combines the detected signal with the reference signal to form a continuously-variable data-pattern-independent gain control signal which is applied to the adjustable gain circuit for controlling the gain thereof.

6 Claims, 14 Drawing Figures

| FIG. 3 | FIG. 4 |

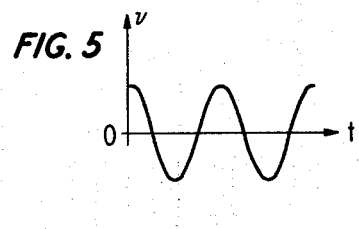
FIG. 5
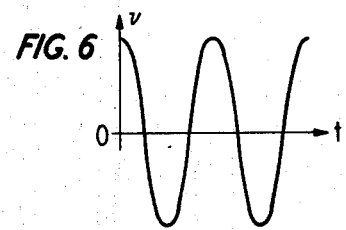
FIG. 6
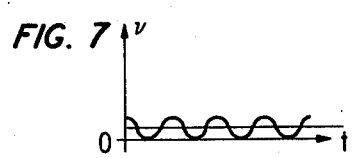
FIG. 7
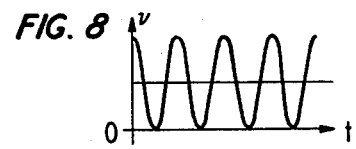
FIG. 8
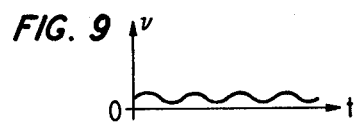
FIG. 9
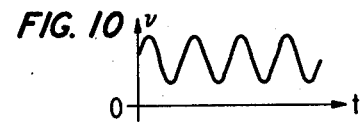
FIG. 10
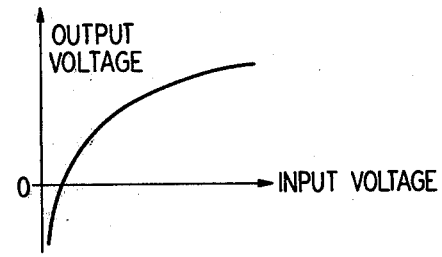
FIG. 11 LOG AMP CHARACTERISTICS
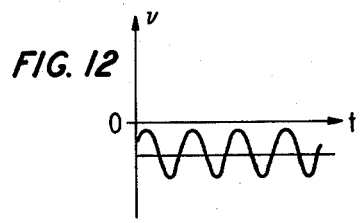
FIG. 12
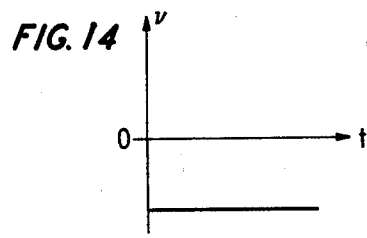
FIG. 14
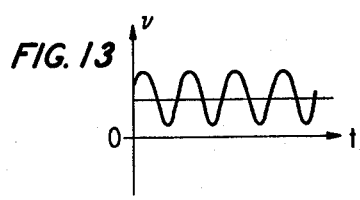
FIG. 13

1

REGENERATOR HAVING AUTOMATIC GAIN CONTROL REFERENCED TO A DATA-PATTERN-DEPENDENT PULSE STREAM

BACKGROUND OF THE INVENTION

The invention relates to a pulse code modulation (PCM) regenerator that is more particularly described as a regenerator having automatic gain control (AGC) referenced to a data-pattern-dependent pulse stream.

It is well known that a PCM system reconstructs a transmitted pulse train after it has traveled through a dispersive, noisy medium. This process is referred to as pulse regeneration and includes retiming of the pulses and regeneration of their amplitudes. The process includes deciding whether the signal amplitude is above or below some threshold at the sampling time. Linear amplifiers are used for equalizing and noise band limiting the transmitted pulse stream.

Because deviations of amplifier gain from nominal gain can cause degradation, automatic gain control (AGC) is needed in regenerator circuits. Although it is desirable to use a steady reference tone from received signals for developing an AGC signal, there is no naturally occurring steady tone in the pulse stream of any practical PCM system. Instead the spectral content of the pulse stream is dependent upon the pattern of the pulse stream being transmitted. An examination of known pulse stream patterns shows that the shapes of their power spectra are quite different from one another. Since any one of several known pulse patterns can be transmitted on a PCM line at any time and for any deviation, no amount of statistical or time averaging can reduce the range of spectral amplitudes.

Various methods for stabilizing a regenerator have been described in the literature. One such method is described in U.S. Pat. No. 3,404,232, issued Oct. 1, 1968 in the name of T. M. Burford. Such patent discloses the use of amplitude correcting signals generated by plural secondary amplitude sensing circuits to adjust the gain of a signal amplifier.

The plural secondary amplitude sensing circuits produce discrete steps of amplitude units whenever correction of an input signal is indicated regardless of the actual magnitude of the deviation of the input signal. Finer control can be achieved with the prior art arrangement by adding to the complexity and the cost thereof. It is, however, more desirable to achieve finer control with an arrangement that is simple and inexpensive.

It is an object to develop a PCM regenerator using an automatic gain control signal that is derived from the data-pattern-dependent pulse stream.

It is another object to develop a simple and economical automatic gain control arrangement which achieves fine control.

SUMMARY OF THE INVENTION

These and other objects of the invention are achieved by a roving reference automatic gain control arrangement in a regenerator of a pulse code modulation system. An adjustable gain circuit receives a sequence of data pulses and produces a data-pattern-dependent input signal. A signal channel circuit, responsive to the input signal, produces a data-pattern-dependent unipolar detected signal. Regeneration circuitry, responsive to the input signal, produces a regenerated data-pattern-dependent output signal. A reference channel circuit, responsive to the output signal, produces a data-pattern-dependent unipolar reference signal. A circuit algebraically combines the detected signal with the reference signal to form a continuously-variable data-pattern-independent gain control signal which is applied to the adjustable gain circuit for controlling the gain thereof.

It is a feature of the invention to use the data-pattern-dependent signal, produced by the reference channel circuit, as a reference for determining a continuously-variable automatic gain control signal.

It is another feature to process detected and reference signals in separate channels having substantially matched electrical characteristics.

It is another feature to use log amplifiers for compressing signals in the separate detected signal and reference signal channels before combining them into a control signal.

It is still another feature to combine the outputs of the detected signal and the reference signal channels eliminating common-mode fluctuations and producing a continuously-variable output signal substantially proportional to differential-mode fluctuations between the detected and reference signals.

BRIEF DESCRIPTION OF THE DRAWINGS

A fuller understanding of the invention will be more readily apparent from the following detailed description when it is read with reference to the following drawings wherein:

FIGS. 5–10 are a series of waveforms showing the response of sections of the automatic gain control arrangement to illustrative signals;

FIG. 11 shows a characteristic curve; and

FIGS. 12–14 show waveforms of the response of other sections of the gain control arrangement.

DETAILED DESCRIPTION

Figure 1:
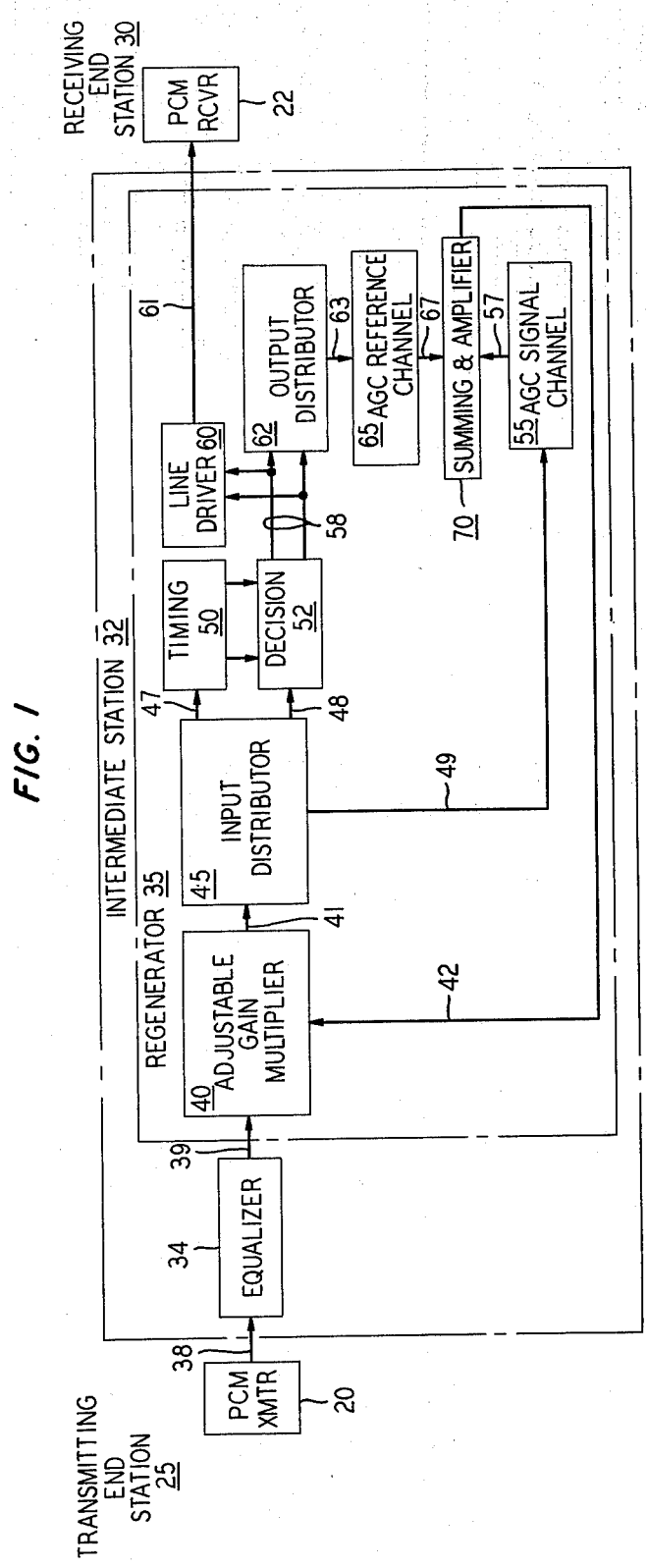
FIG. 1 is a block diagram of a pulse code modulation transmission system including an intermediate regenerator having an automatic gain control arrangement.
Figure 2:
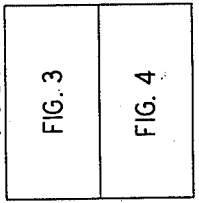
FIG. 2 is a diagram showing how to arrange FIGS. 3 and 4 to form a schematic of the regenerator of FIG. 1.

Referring now to FIG. 1, there is shown a pulse code modulation (PCM) transmission system including a transmitter 20 and a receiver 22 located, respectively, at a transmitting end station 25 and a receiving end station 30. At an intermediate station 32, there is an equalizer 34 and a pulse regenerator 35 which receive sequences of a data-pattern-dependent signal from the transmitter 20 and regenerate that signal for continued transmission to the receiver 22.

The equalizer 34 receives signals from the transmitter 20 by way of a transmission medium 38. The equalizer is arranged for eliminating variation of signal amplitude with cable length and temperature. The amplitude of the resulting equalized signal on lead 39 is dependent upon the gain of the amplifiers in the equalizer 34, as well as the amplitude of the signal transmitted from the transmitter 20. The equalizer 34 may be any known equalizer designed for a channel of a pulse code modulation transmission system at the system pulse rate. An example of such an equalizer is disclosed in U.S. Pat. No. 3,728,649, issued on Apr. 17, 1973 in the name of F. D. Waldhauer.

The equalized signal on lead 39 is received by an adjustable gain multiplier circuit 40 which produces a scaled version of that signal on lead 41. Gain of the circuit 40 is controlled by an automatic gain control signal that is applied through a lead 42. An input distributor 45 responsive to the input signal on lead 41 fans out that signal by way of leads 47, 48 and 49 to a timing recovery circuit 50, a decision circuit 52 and an AGC signal channel circuit 55. The AGC signal channel circuit 55 produces a data-pattern-dependent detected signal on lead 57 in response to the input signal.

Further, in response to the input signal coupled through leads 47 and 48, the timing recovery circuit 50 and the decision circuit 52 regenerate a sequence of output signals on leads 58 representing the regenerated data sequence of the input signal. An example of a suitable timing recovery circuit is disclosed in U.S. Pat. No. 4,015,083, issued on Mar. 29, 1977 in the name of J. A. Bellisio. The decision circuit 52 is described in greater detail hereinafter.

The output signal is fanned out through the leads 58 to a line driver 60 and an output distributor 62. Line driver 60 transmits the regenerated output signal through transmission medium 61 to the receiver 22 at the receiving end station 30. Output distributor 62 converts the output signal to a single-ended output signal on lead 63 connecting to an AGC reference channel 65. The AGC reference channel 65 produces a continuously-variable data-pattern-dependent reference signal on lead 67 in response to the single-ended output signal on lead 63.

A summing and amplifier circuit 70 combines the data-pattern-dependent detected signal on lead 57 with the data-pattern-dependent reference signal on lead 67 into a slowly varying continuous gain control signal which is applied by way of the lead 42 to the adjustable gain circuit 40 for controlling the gain thereof.

Figure 3:
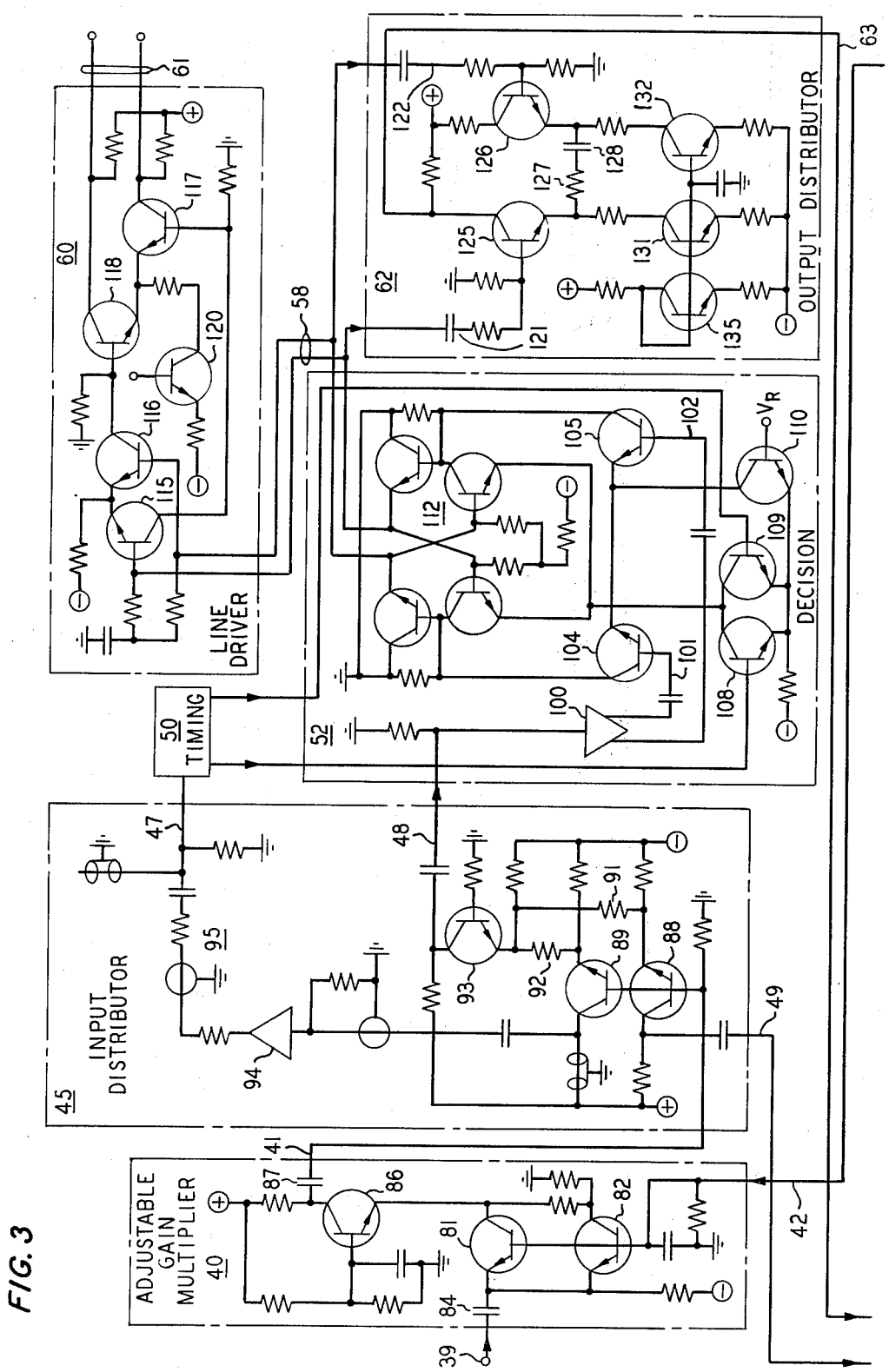
Figure 4:
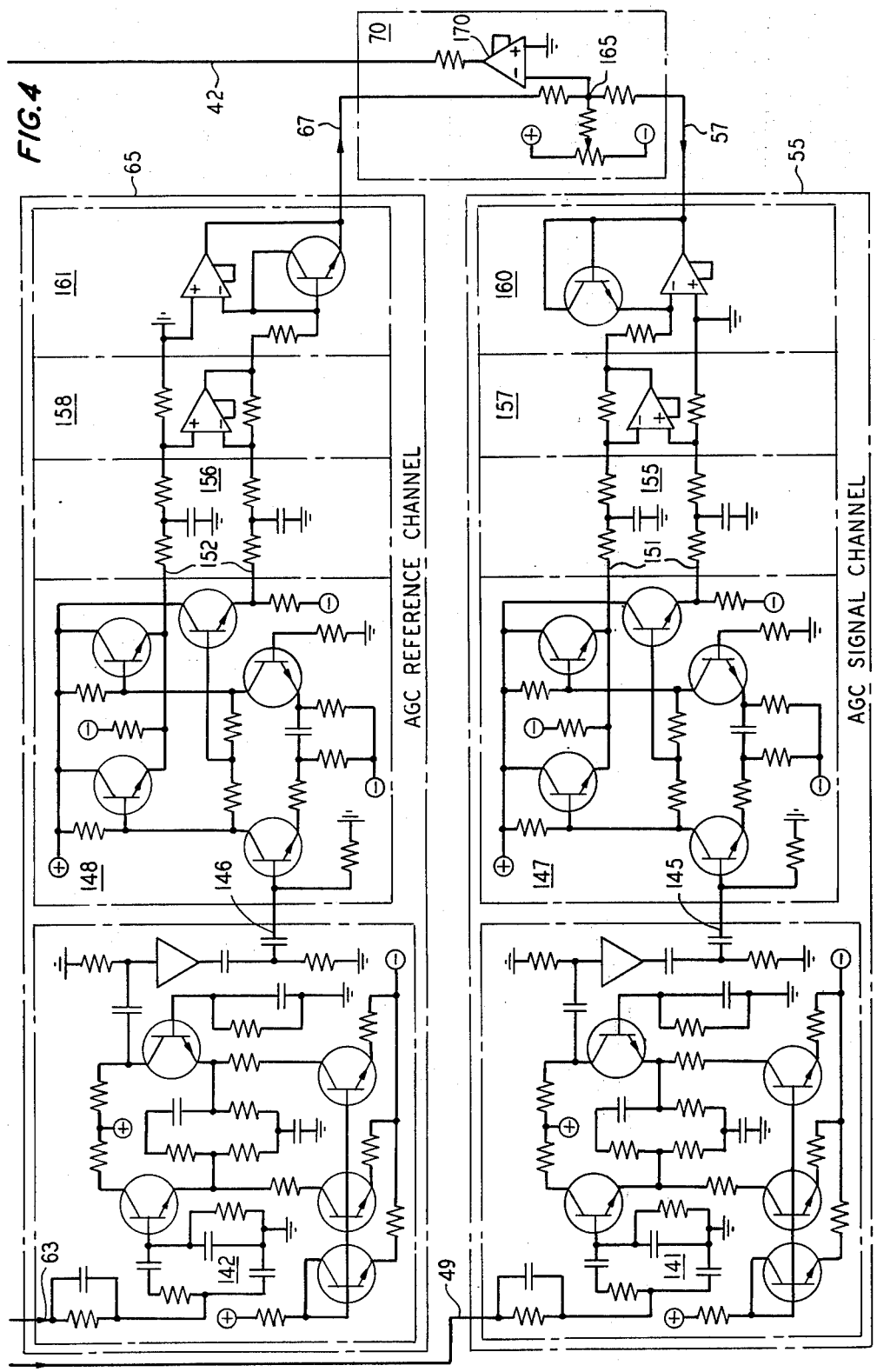

In the schematic diagram of FIGS. 3 and 4, the adjustable gain circuit 40 includes two common-base transistor amplifiers 81 and 82. Equalized signals on lead 39 are coupled through a capacitor 84 and are applied in parallel to the emitter electrodes of the transistors 81 and 82. The base of the transistor 81 is connected to ground. A control voltage on the lead 42, to be described subsequently, is applied to the base electrode of the transistor 82 for controlling the gain of the circuit. As a result, current I from the equalized signal on lead 39 is divided between the two emitter electrodes such that the current in transistor 82 is XI and the current in the transistor 81 is (1-X)I. The control signal on lead 42 operates solely to change the magnitude of X.

The resulting signal from the transistors 81 and 82 is coupled through a third common-base connected transistor 86. Resulting output signals produced by the adjustable gain multiplier 40 are coupled by way of a capacitor 87 and lead 41 to the input distributor circuit 45 where they are applied to the base electrodes of a pair of common-emitter connected transistors 88 and 89. Each of the transistors 88 and 89 is connected through a separate emitter resistor, 91 and 92, to the emitter of a third emitter-connected transistor 93.

Each of the three transistors 88, 89 and 93 drives a separate output. Through the lead 49, the transistor 88 drives the AGC signal channel 55, to be described subsequently. The transistor 89 has its output coupled through an amplifier 94 and a wave-shaping network 95 to the timing recovery circuit 50. As previously mentioned, a suitable timing recovery circuit is described in the Bellisio patent. The transistor 93 produces an output which is coupled through the lead 48 to the input of the decision circuit 52. In the decision circuit, the signal on lead 48 is applied to an amplifier 100 that converts the signal to a double-rail signal.

The decision circuit 52 responds to the double-rail signals and regenerates output signals on leads 58 representing the received data stream. In the decision circuit, the double-rail signals on leads 101 and 102 are applied to an emitter-coupled pair of transistors 104 and 105. From the timing circuit 50, a balanced sine wave at the baud is applied to the bases of another emitter-coupled pair of transistors 108 and 109 which are connected in an emitter-coupled triple. The phase of the wave applied to the base of transistor 109 is delayed with respect to the phase of the wave applied to the base of transistor 108 to allow the third transistor 110 to conduct briefly near the zero crossings of the timing wave.

When the transistor 110 conducts it energizes the pair of emitter-coupled transistors 104 and 105, which are responsive to the double-rail signals, and thus samples the data stream.

When the transistor 110 of the emitter-coupled triple stops conducting, a flip-flop 112 is energized by the transistors 108 and 109 of the emitter-coupled triple. The flip-flop 112 is constrained to conduct on one side in accordance with the collector voltages on the pair of data input transistors 104 and 105. These collector voltages will correspond to the input data being applied at the last prior sampling time. Output signals from the decision circuit 52 are fanned out by way of the leads 58 to the output distributor 62 and to the line driver circuit 60.

In the line driver circuit 60, the double-rail signals are applied to the base input electrodes of an emitter-coupled pair of transistors 115 and 116. Output signals from the emitter-coupled pair 115 and 116 are coupled to the base input electrodes of a second emitter-coupled pair of transistors 117 and 118 having a transistor 120 in the common-emitter path. Output signals from the second emitter-coupled pair 117 and 118 are taken from the respective collector electrodes and are applied to the transmission line 61 leading to the receiver circuit 22 shown in FIG. 1.

The output signals, from the decision circuit 52 and applied to the output distributor 62, are each coupled respectively through a separate series resistor-capacitor circuit 121 and 122 to base input electrodes of two transistors 125 and 126 connected in a common-emitter circuit configuration. The emitter electrodes of the two transistors are coupled together by a resistor 127 and a capacitor 128 in a series circuit configuration. Transistor current sources 131 and 132 are connected in the emitter paths of the transistors 125 and 126, respectively. A reference voltage that is applied to the base electrodes of transistors 131 and 132 is determined by a voltage divider network having a diode connected transistor 135 inserted between the resistors and having a connection directly between the anode of the diode and the base electrodes of the current source transistors 131 and 132. Output signal taken from the collector electrode of the common-emitter transistor 125 is coupled by way of the lead 63 to the input of the AGC reference channel 65.

The AGC signal channel 55 and the AGC reference channel 65 are matched electrically with each other as nearly as practical. Signal channel 55 responds to the input signal on lead 49 while the reference channel responds to the output signal on lead 63. Detected signal channel 55 includes a bandpass filter arrangement 141 together with some flat gain amplifiers. Signals that are passed through the filter 141 have a frequency less than 1/10th the frequency of the data stream and perhaps as low as 1/20th to 1/30th of the frequency of the data stream. The signal passed through the bandpass filter 141 and the flat gain amplifiers to lead 145 is an alternating current signal which is shown illustratively in FIG. 5.

Reference signal channel 65 includes a bandpass filter 142 that responds to signals on lead 63 producing a low frequency signal on lead 146, as shown in FIG. 6. Although the bandpass filters of the two channels 55 and 65 operate similarly on the signals applied to their inputs, the output signals may have different amplitudes, as shown in FIGS. 5 and 6. These different amplitudes occur because of differences in the amplitudes of the input signal on lead 49 and the output signal on lead 63 of the regenerator. The difference between the amplitudes of the input and output signals may be caused by reduced flat gain in the system or may be caused by a malfunction, such as reduced output from the transmitter 20, shown in FIG. 1.

The output of the bandpass filter on lead 145 is applied to the input terminal of a square law detector 147 which produces on leads 151 double-rail output signals having a frequency that is twice the frequency of the signal applied by way of lead 145 to the input. The output signals are unipolar and therefore have a d.c. component. An illustrative waveform is shown in FIG. 7.

The output of the bandpass filter on lead 146 is applied to the input of a similar square law detector 148 which produces double-rail output signals on leads 152. These signals on leads 152 likewise are doubled in frequency and are unipolar. FIG. 8 shows an illustrative waveform.

The peak amplitudes of the output signals of the square law detectors 147 and 148 are related to one another as the squares of their input amplitudes. As shown in FIGS. 5 and 6, the amplitude of the input of the reference channel 65 equals twice the amplitude of the input of the signal channel 55. Therefore, the amplitude of the output of the square law detector in the reference channel, as shown in FIG. 8 equals four times the amplitude of the output of the square law detector in the signal channel, as shown in FIG. 7. It is noted that the peaks and the valleys of the output signals are rounded and that the output wave is generally sinusoidal in shape. Although the detectors 147 and 148 are described as square law detectors other nonlinear rectifying detectors can be used. In channel 55, output signals on double-rail leads 151 are applied to a pair of low-pass filters 155. Similarly, output signals on double-rail leads 152 are applied to a like pair of low-pass filters 156 in channel 65.

Each filter of the pair of low-pass filters in channel 55 is a series-resistance shunt-capacitance T-filter. The d.c. component from the square law detector 147 passes unchanged through the filters 155. The output of the filters 155 remains a double-rail signal. Some phase shift occurs between the inputs and the outputs of the filters 155.

Similarly, the filters 156 are arranged to respond to the signals on leads 152 for producing a phase-shifted double-rail output signal having an unchanged d.c. component from the square law detector 148.

Fluctuating signals passed through the filters 155 and 156 are attenuated similarly.

Similar amplifier circuits 157 and 158 are included in the channels 55 and 65, respectively. In channel 55, the amplifier circuit 157 responds to the double-rail signal from the filters 155 and converts it to a single-rail signal, as shown in FIG. 9. Likewise, the amplifier 158 responds to the double-rail signal from the filters 156 and produces a single-rail signal, as shown in FIG. 10. It is noted that the amplifiers 157 and 158, in the respective channels 55 and 65, are connected with a different polarity.

The resulting single-rail signal from the amplifier 157, as shown in FIG. 9, is applied to the input of a logarithmic amplifier 160 in the signal channel 55. Likewise the single-rail signal from the amplifier 158, as shown in FIG. 10, is applied to the input of a similar logarithmic amplifier 161.

Each of the logarithmic amplifiers 160 and 161 has a characteristic, as shown in FIG. 11. They are, however, of opposite polarities. The logarithmic input to output voltage characteristic of those amplifiers has an exponential shape. This characteristic has no effect on the frequency of the signals applied, but it produces output signals having the same amplitude even though the related input signals have very different amplitudes. The logarithmic amplifiers thus compress their respective different input signals so that they produce similar amplitude fluctuations at their outputs 57 and 67, as shown in FIGS. 12 and 13. These outputs are separated from each other by a d.c. component which results from the difference in amplitude between the input and output signals of the regenerator 35. The fluctuating output on lead 67 is a moving or roving reference that fluctuates in response to the pattern of data received on lead 39.

Compressor action in the log amplifiers 160 and 161 reduces amplitude differences between common-mode signals in the detected signal channel 55 and the reference signal channel 65. The output signals on leads 57 and 67 from the two logarithmic amplifiers 160 and 161 are applied to the inputs of the algebraic summing and amplifier circuit 70 where they are summed.

Because of different polarities of the signals from the logarithmic amplifiers 160 and 161, one signal is directed into a common node 165 and the other signal is directed away from the node 165 in the circuit 70. The resulting signal on the node 165 is the difference between the two applied signals. This is a d.c. offset signal corresponding to the difference between the d.c. components of the two signals, shown in FIGS. 12 and 13 and produced by the logarithmic amplifiers 160 and 161.

As shown in FIG. 14, the d.c. value of the difference is expected to fluctuate slowly as a result of changes in the amplitudes of the input and output signals of the regenerator 35. The detected signal channel 55 and the reference signal channel 65 substantially eliminate common-mode fluctuations in signals being processed through the regenerator. Both the magnitude and the polarity of the signal on the node 165 can change in response to the relative amplitudes of the input and output signals of the regenerator.

The signal on the node 165 is applied to an amplifier 170 which produces an output signal that is fed back by way of the lead 42 to the base electrode of the transistor 82 in the adjustable gain multiplier circuit 40. This feedback signal is a continuously-variable data-pattern-independent gain control signal. Depending upon the magnitude and polarity of the control signal on lead 42, the gain of the adjustable gain circuit 40 is adjusted to reduce the difference in amplitude between the input and output signals of the regenerator 35.

The foregoing description presents in detail the arrangement and operation of an illustrative regenerator embodying the invention. This embodiment together with other embodiments obvious to those skilled in the art are considered to be included within the scope of the invention.

I claim:

1. A regenerator comprising
   an adjustable gain circuit responsive to a sequence of data pulse signals for producing a data-pattern-dependent input signal,
   means responsive to the input signal for producing a data-pattern-dependent detected signal,
   means responsive to the input signal for regenerating a data-pattern-dependent output signal,
   means responsive to the output signal for producing a data-pattern-dependent reference signal,
   means for algebraically combining the detected signal with the reference signal to form a continuously-variable data-pattern-independent gain control signal, and
   means for applying the continuously-variable data-pattern-independent gain control signal to the adjustable gain circuit for controlling the gain thereof.

2. A regenerator in accordance with claim 1 wherein the data-pattern-dependent detected signal producing means comprise a detected signal channel having predetermined electrical characteristics, and the data-pattern-dependent reference signal producing means comprise a reference signal channel having predetermined electrical characteristics substantially matched with the electrical characteristics of the detected signal channel.

3. A regenerator in accordance with claim 2 wherein the detected signal channel and the reference signal channel each includes in a series circuit arrangement, a bandpass filter, a nonlinear rectifying detector, a low-pass filter, and a logarithmic amplifier.

4. A regenerator in accordance with claim 2 wherein the input signal and the output signal include common-mode fluctuations and differential-mode fluctuations,
   the detected signal channel and the reference signal channel substantially eliminate the common-mode fluctuations, and
   the combining means respond to the differential-mode fluctuations and produce a slowly varying continuous control signal substantially proportional to the differential-mode fluctuations.

5. A regenerator in accordance with claim 2 wherein the detected signal channel and the reference signal channel each includes a similar compressor circuit for reducing amplitude differences between the common-mode fluctuations occurring in the detected and reference signals.

6. A regenerator in accordance with claim 5 wherein the compressor circuits of the detected signal channel and the reference signal channel are logarithmic amplifiers.

* * * * *